(12) United States Patent
Chen et al.

(10) Patent No.: US 7,826,025 B2
(45) Date of Patent: Nov. 2, 2010

(54) ATTACHMENT PROCESS FOR FLEXIBLE SUBSTRATES AND PATTERNED SEALANT WITH CIRCULAR POINT ADHESIVE AT OPENING OF FRAME THAT HAS A GUIDING RIB SO THAT OPENING WIDTH INCREASES WITH DISTANCE FROM FRAME

(75) Inventors: Shin-Chi Chen, Chiayi County (TW); Yao-Zen Chang, Taipei County (TW); Chang-Chou Li, Tainan (TW); Chih-Yu Ke, Pingtung County (TW); Huang-Sheng Fang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 249 days.

(21) Appl. No.: 12/117,241

(22) Filed: May 8, 2008

(65) Prior Publication Data
US 2009/0168006 A1 Jul. 2, 2009

(30) Foreign Application Priority Data
Dec. 27, 2007 (TW) .............................. 96150493 A

(51) Int. Cl.
*G02F 1/1339* (2006.01)
(52) U.S. Cl. ...................................... 349/153; 349/190
(58) Field of Classification Search ................ 349/153, 349/154, 190
See application file for complete search history.

(56) References Cited

U.S. PATENT DOCUMENTS

| 4,610,510 | A | * | 9/1986 | Funada et al. | 349/187 |
| 6,552,772 | B2 | | 4/2003 | Egami | |
| 7,133,107 | B2 | * | 11/2006 | Park | 349/153 |
| 2006/0109413 | A1 | * | 5/2006 | Lee | 349/153 |

FOREIGN PATENT DOCUMENTS

CN 1188246 A 7/1998

* cited by examiner

*Primary Examiner*—John Heyman
(74) *Attorney, Agent, or Firm*—WPAT., P.C.; Justin King

(57) ABSTRACT

An attachment process for flexible substrates and a patterned sealant used therein are provided. The attachment process is mainly used to manufacture flexible liquid-crystal displays (LCDs). Firstly, a patterned sealant with an opening is applied to a first substrate, and then a liquid crystal material is filled in the patterned sealant. During a pressing process for combining the first substrate and a second substrate, bubbles can be automatically evacuated from the opening of the patterned sealant, and the patterned sealant will deform and expand to seal the opening after the pressing process. By applying the patterned sealant with an opening in the manufacturing process of flexible LCDs, bubbles are easily evacuated and the opening of the patterned sealant is directly and automatically sealed in the pressing process under the atmospheric pressure.

2 Claims, 10 Drawing Sheets

ATTACHMENT PROCESS FOR FLEXIBLE SUBSTRATES AND PATTERNED SEALANT WITH CIRCULAR POINT ADHESIVE AT OPENING OF FRAME THAT HAS A GUIDING RIB SO THAT OPENING WIDTH INCREASES WITH DISTANCE FROM FRAME

BACKGROUND OF THE INVENTION

1. Field of the Invention

The present invention generally relates to an attachment process for flexible substrates and a patterned sealant used therein and, more particularly, to an attachment process for flexible substrates and a patterned sealant used in the attachment process wherein bubbles are easily evacuated and the opening of the patterned sealant is automatically sealed in the pressing process under the atmospheric pressure.

2. Description of the Prior Art

In the manufacturing process for the liquid-crystal displays (LCDs), the liquid crystal material is filled in the patterned sealant through an opening and then the opening is sealed.

Conventionally, there are two methods for filling. One is vacuum filling by capillary phenomenon and the other is one drop filling (ODF). In vacuum filling, a panel comprising two attached substrates is first disposed in a vacuum chamber to be pumped and the opening of the patterned sealant between the two attached substrates is exposed to a liquid crystal material so that the liquid crystal material is sucked into the patterned sealant after the vacuum is broken. The opening of the patterned sealant is sealed after the panel is filled with the liquid crystal material and cleaned. Please refer to U.S. Pat. No. 6,552,772 for vacuum ODF as shown in FIG. 1, wherein a patterned sealant 10 is formed between the substrates 11, 12 that are disposed between the sucking plates in a chamber 13. The liquid crystal material 14 is dropped on the bottom substrate 12 and the chamber 13 is pumped. The patterned sealant 10 is then solidified after the top substrate 11 is attached to the bottom substrate 12. These two methods require vacuum pumping, which results in long manufacturing time and high equipment cost. Moreover, vacuum filling results in a waste of the liquid crystal material, and cleaning and sealing are required.

Accordingly, these two methods are not suitable for liquid-crystal filling and sealing for flexible liquid-crystal displays. On the contrary, the manufacturing process for flexible liquid-crystal displays can be performed under the atmospheric pressure with lost cost. However, there are still problems due to bubble formation during filling and sealing.

SUMMARY OF THE INVENTION

It is an object of the present invention to provide an attachment process for flexible substrates and a patterned sealant used in the attachment process wherein bubbles are easily evacuated and the opening of the patterned sealant is automatically sealed in the pressing process under the atmospheric pressure.

To achieve the foregoing object, the present invention provides an attachment process for flexible substrates, comprising steps of:

providing a first substrate with a top surface;

dispensing a patterned sealant fixedly disposed on the top surface of the first substrate, wherein at least an opening is disposed in the patterned sealant;

filling a liquid-phase material in a region enclosed by the top surface of the first substrate and the patterned sealant;

pressing a second substrate covering the patterned sealant, the liquid-phase material and the top surface of the first substrate so that the liquid-phase material is pressed to spread inside the patterned sealant, to evacuate bubbles from the patterned sealant through the opening, and to seal the opening so that the liquid-phase material is enclosed; and solidifying the patterned sealant.

Preferably, the liquid-phase material is a liquid crystal material or an adhesive.

Preferably, the patterned sealant is a solid-state sealant and the patterned sealant is solidified by using a UV light beam.

Preferably, the second substrate is pressed by using a roller and the roller rolls from a first side to a second side.

By using the disclosure of the present invention, the liquid crystal material is filled in the patterned sealant between the flexible substrates under the atmospheric pressure, the bubbles and the superfluous liquid crystal material can be evacuated and the opening can be automatically sealed after the attachment process. Moreover, the present invention can be implemented using cheaper equipment under the atmospheric pressure without a vacuum environment and equipment so as to shorten the manufacturing time and reduce the cost.

BRIEF DESCRIPTION OF THE DRAWINGS

The objects, spirits and advantages of the embodiments of the present invention will be readily understood by the accompanying drawings and detailed descriptions, wherein.

DETAILED DESCRIPTION OF THE PREFERRED EMBODIMENT

Figure 1:
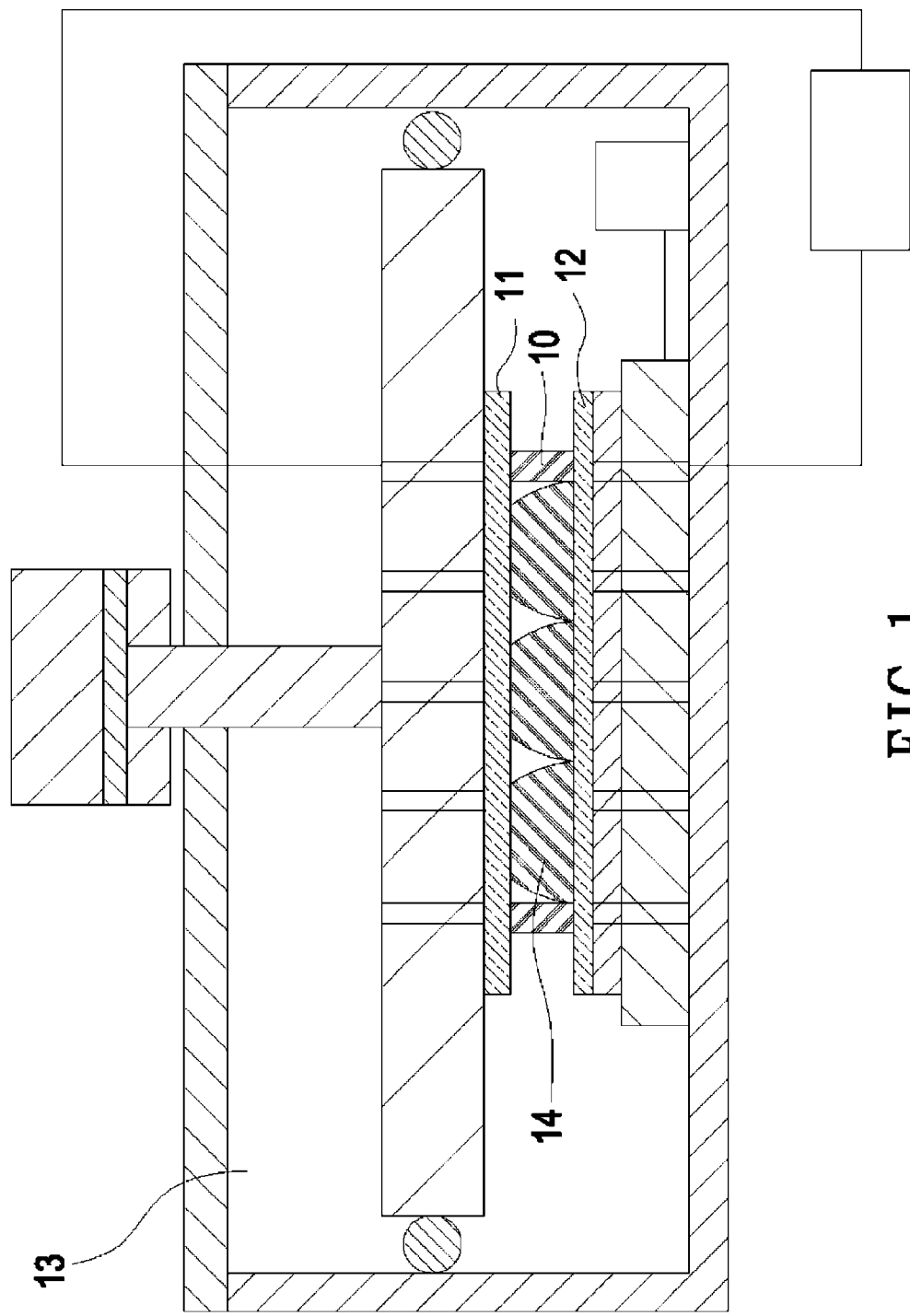
FIG. 1 is a schematic diagram showing one-drop filling process for filling the liquid-crystal material into a LCD panel.
Figure 2:
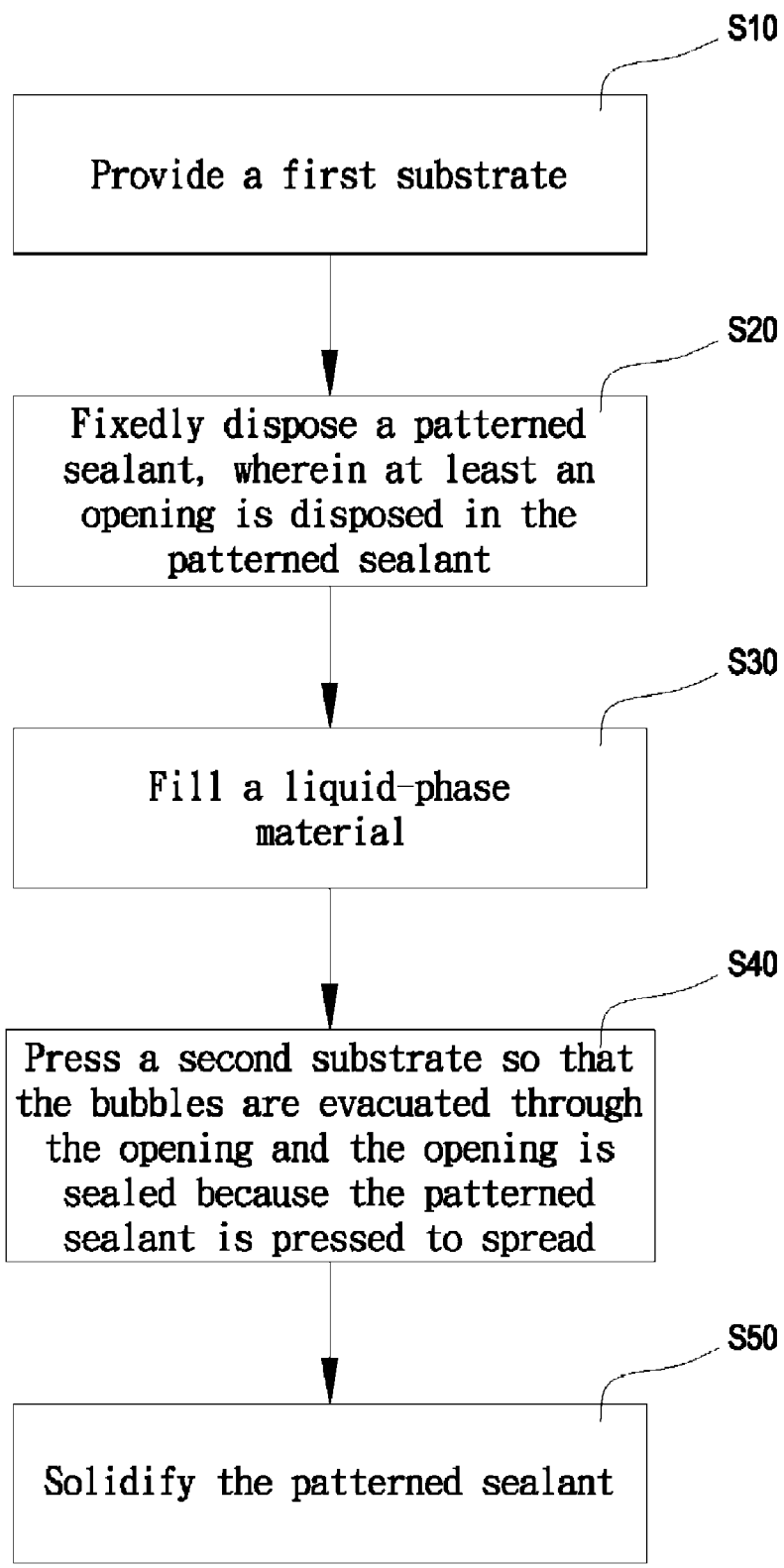
FIG. 2 is a flowchart of an attachment process for flexible substrates according to the present invention.
Figure 2A:
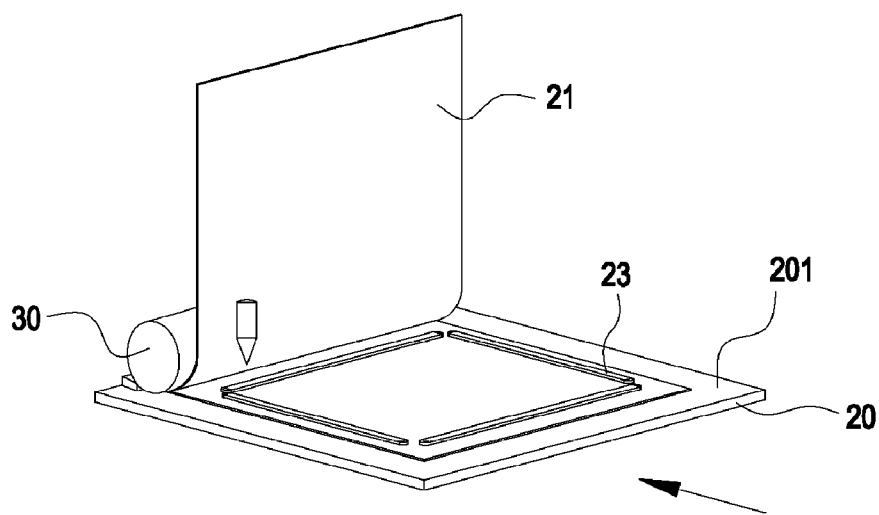
FIG. 2A to FIG. 2C are 3-D views showing the attachment process for flexible substrates according to the present invention.
Figure 2B:
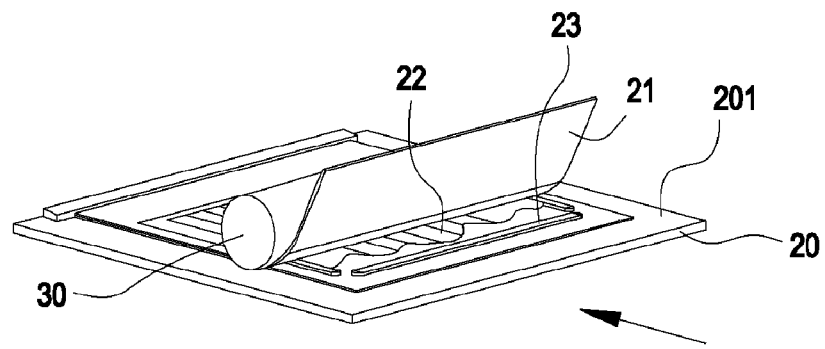
Figure 2C:
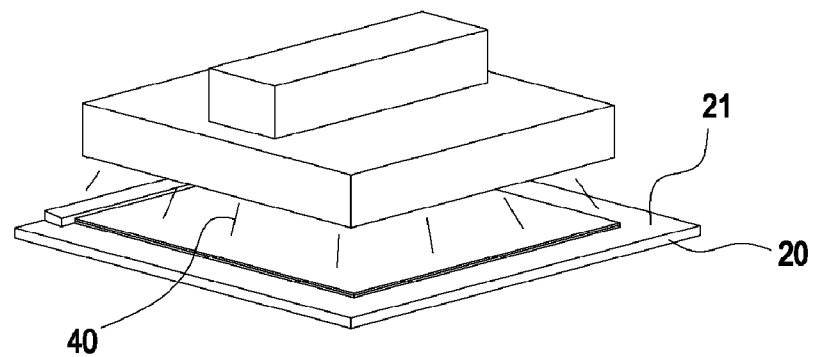
Figure 3A:
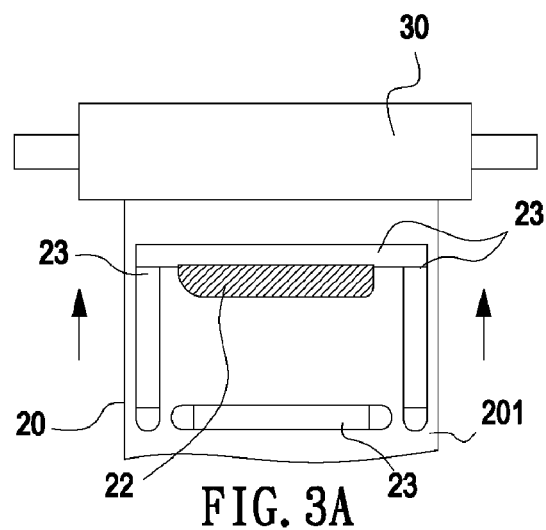
FIG. 3A to FIG. 3C are top views showing the sealing of an opening during the attachment process for flexible substrates according to the present invention.
Figure 3B:
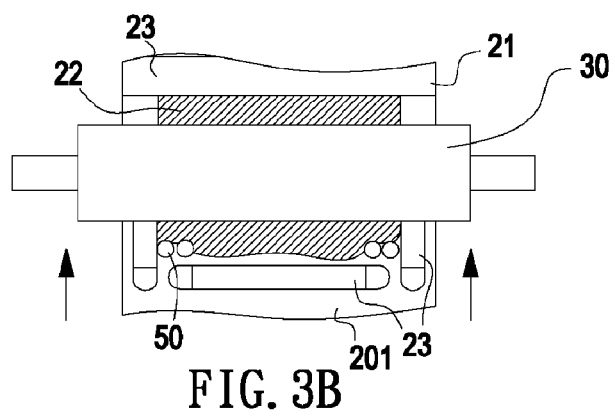
Figure 3C:
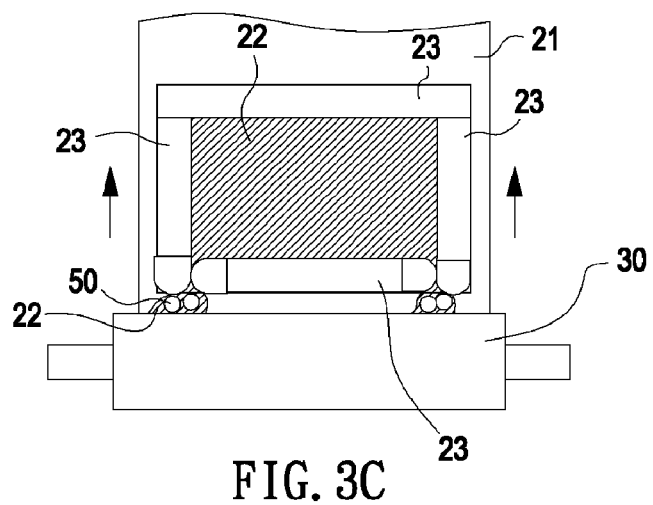
Figure 4A:
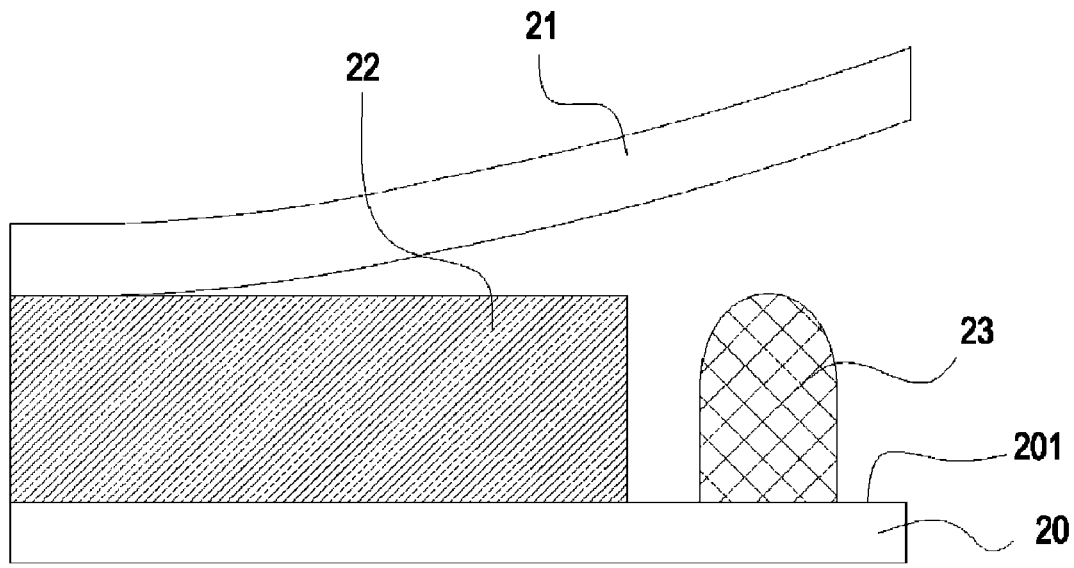
FIG. 4A to FIG. 4B are cross-sectional views showing the sealing of an opening during the attachment process for flexible substrates according to the present invention.
Figure 4B:
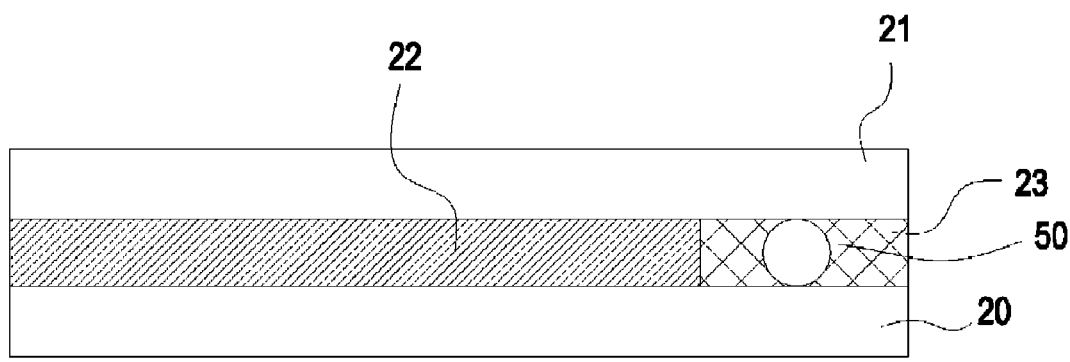

The present invention can be exemplified but not limited by the embodiments as described hereinafter.

Please refer to FIG. 2, FIG. 2A to FIG. 2C, FIG. 3A to FIG. 3C and FIG. 4A to FIG. 4B, wherein the attachment process for flexible substrates comprises steps as described hereinafter.

In Step S10, a first substrate 20 is provided with a top surface 201.

In Step S20, a patterned sealant 23 is dispensed to be fixedly disposed on the top surface 201 of the first substrate 20, wherein at least an opening 2311 is disposed in the patterned sealant 23.

In Step S30, a liquid-phase material 22 is filled in a region enclosed by the top surface 201 of the first substrate 20 and the patterned sealant 23. In the present invention, the liquid-phase material 22 is a liquid-crystal material with viscosity and fluidity, and the bubbles (not shown) therein have been removed before the filling process. Since the filling process is performed under the atmospheric pressure, bubbles 50 are inevitably formed between the liquid-phase material 22 and the patterned sealant 23.

In Step S40, a second substrate 21 is pressing by a roller. The second substrate 21 is flexible and can be provided on a supplier wheel (not shown). The roller 50 is used to press the second substrate 21 to cover the patterned sealant 23, the liquid-phase material 22 and the top surface 201 of the first substrate 20 so that the liquid-phase material 22 is pressed to spread inside the patterned sealant 23, to evacuate bubbles 50 from the patterned sealant 22 through the opening 2311, and to seal the opening 2311 so that the liquid-phase material 22 is enclosed.

In Step S50, the patterned sealant 23 is solidified by using UV illumination.

Figure 5:
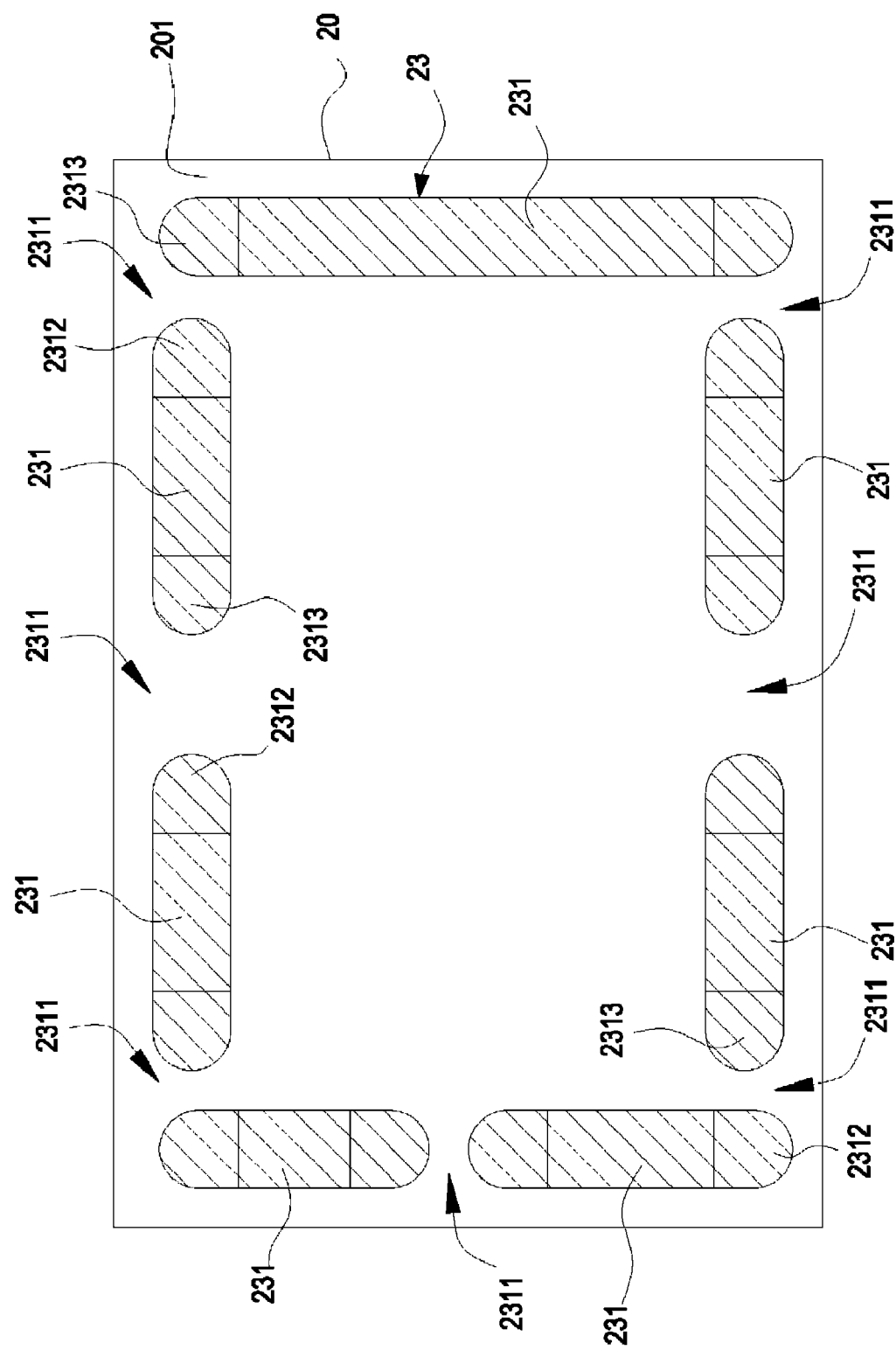
FIG. 5 is a schematic top view showing at least an opening disposed in the patterned sealant according to the present invention.

Please refer to FIG. 5, which is a schematic top view showing at least an opening disposed in the patterned sealant according to the present invention. The patterned sealant for attaching flexible substrates is used as a frame enclosing the liquid-phase material 22 between the first substrate 20 and the second substrate 21. The patterned sealant 23 comprises a sealant material 231, being fixedly disposed on the first substrate 20. The sealant material 231 forms a frame to contain a liquid-phase material 22 and at least an opening 2311 formed by a first end sealant 2312 and a second end sealant 2313 is disposed in the sealant material 231.

Figure 6:
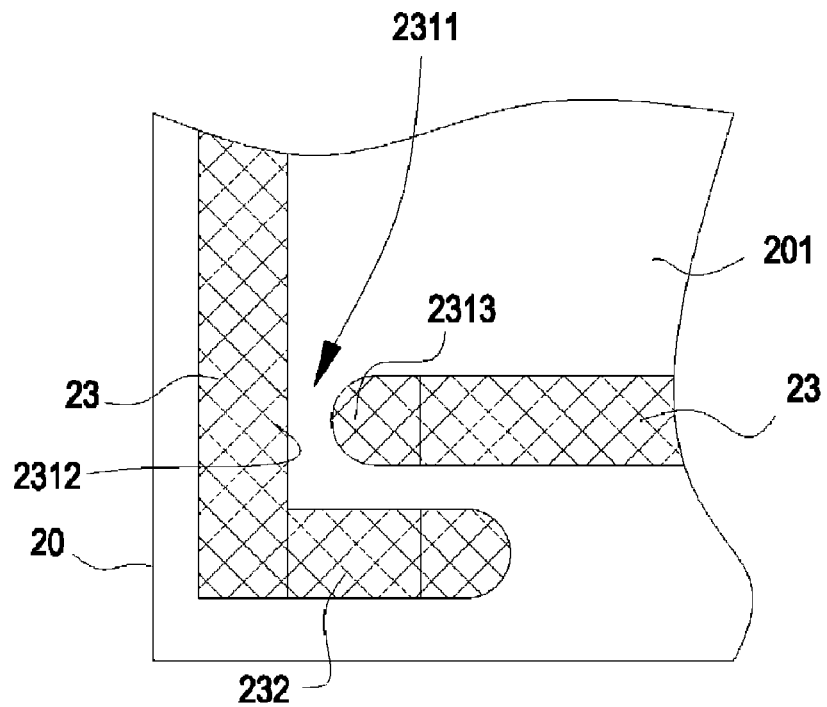
FIG. 6 is a schematic top view showing an opening and a guiding rib forming a right angle with the patterned sealant according to the present invention.
Figure 7A:
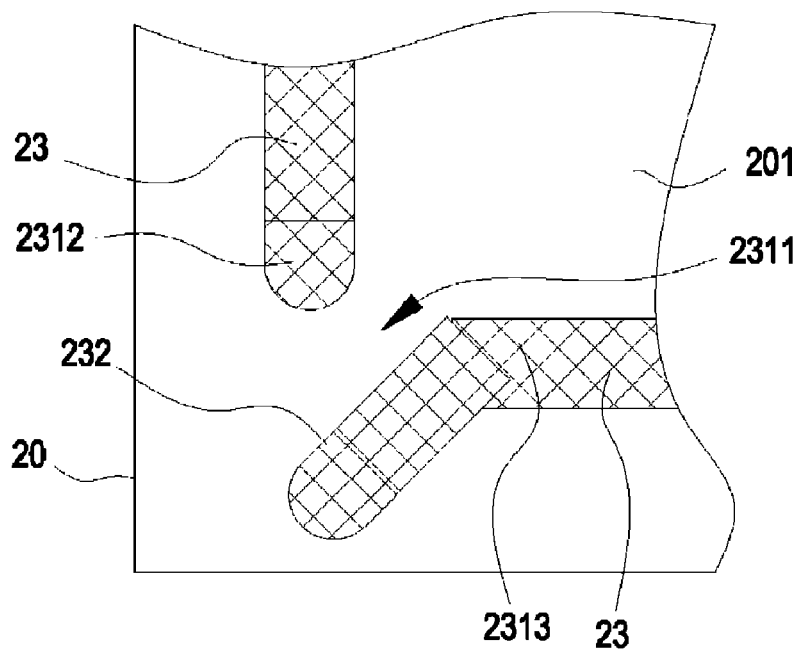
FIG. 7A to FIG. 7C are schematic top views showing an opening and a guiding rib forming an obtuse angle with the patterned sealant according to the present invention.
Figure 7B:
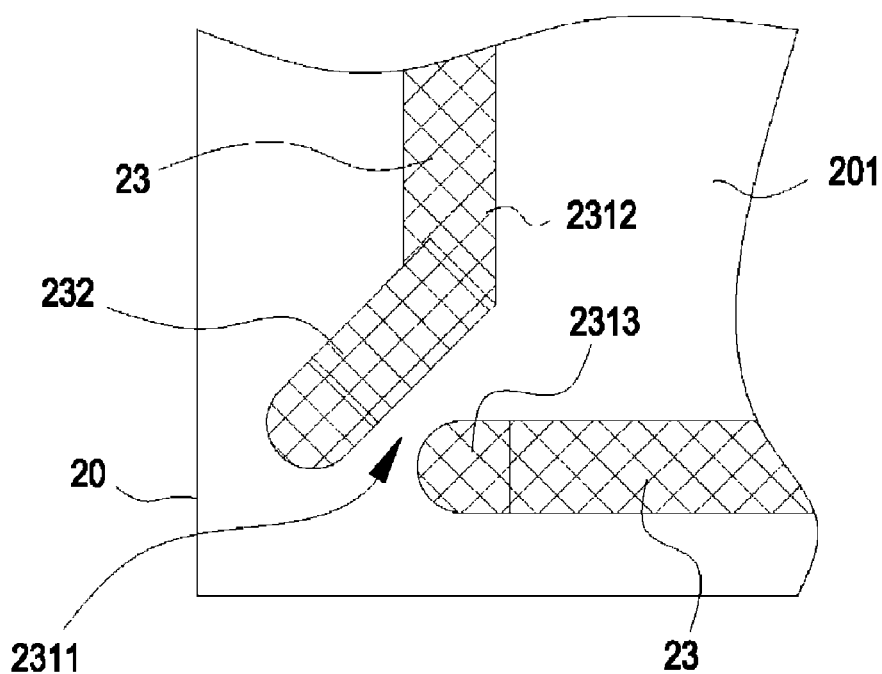
Figure 7C:
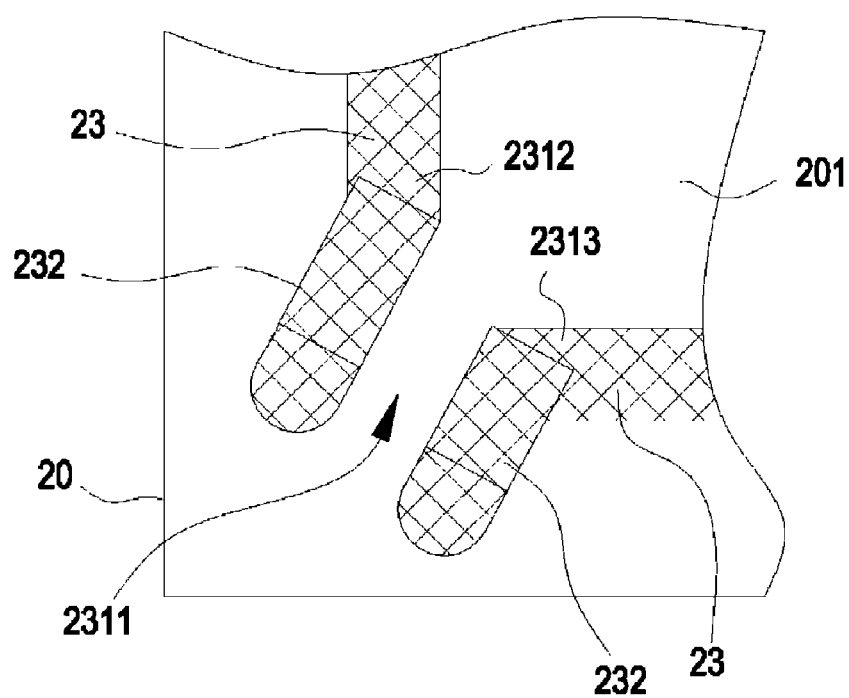
Figure 8A:
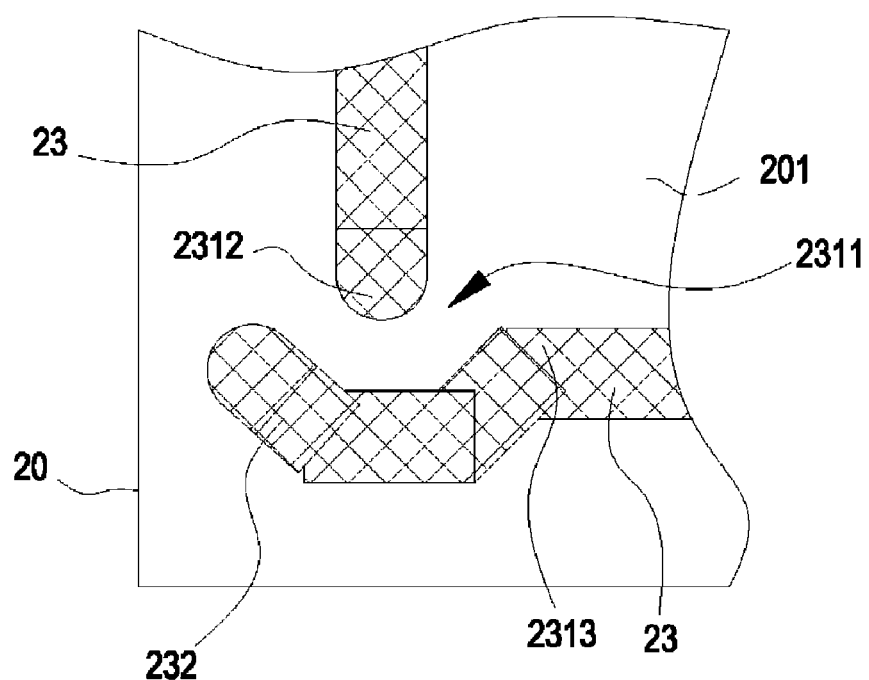
FIG. 8A to FIG. 8B are schematic top views showing an opening and a guiding rib forming a composite angle with the patterned sealant according to the present invention.
Figure 8B:
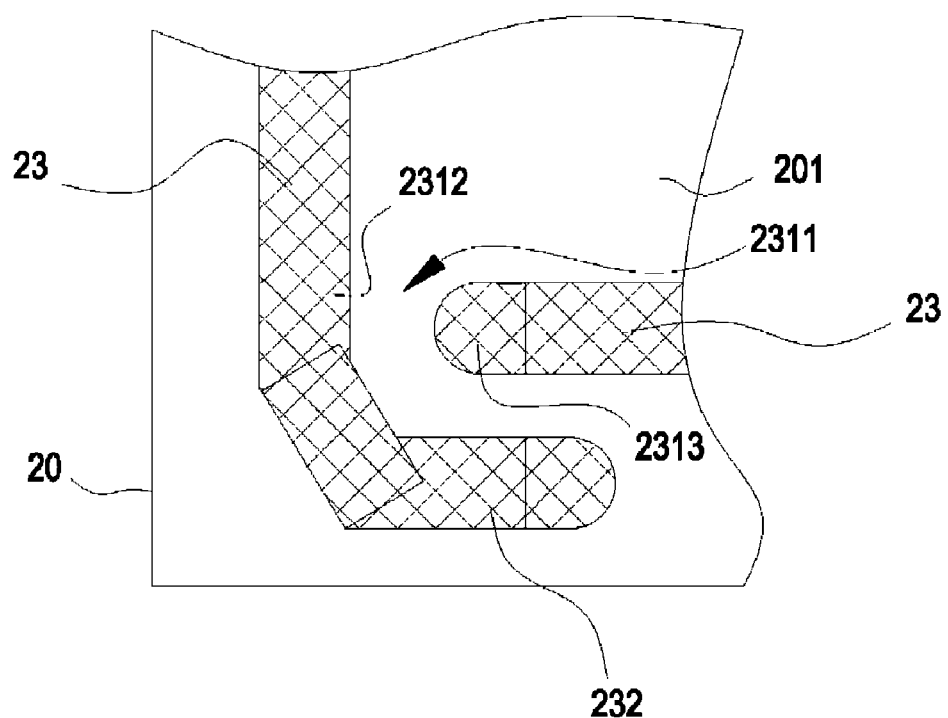

Please refer to FIG. 6, FIG. 7A to FIG. 7C and FIG. 8A to FIG. 8B. In the patterned sealant 23, at least a guiding rib 232 is extended from at least one of the first end sealant 2312 and the second end sealant 2313 that form the opening 2311. The guiding rib 232 is capable of guiding superfluous and overflowing liquid-phase material 22 and helpful for automatic sealing. The guiding rib 232 and the first end sealant 2312 and/or the second end sealant 2313 form a right angle (as shown in FIG. 6) or other angles (as shown in FIG. 7A to FIG. 7C). More particularly, the size of the opening 2311 formed in FIG. 7A changes to be larger, the size of the opening 2311 formed in FIG. 7B changes to be larger, while the size of the opening 2311 formed in FIG. 7C remains unchanged to directly evacuate the bubbles. Alternatively, a composite angle (as shown in FIG. 8A to FIG. 8B) can be formed. In FIG. 8A, the opening 2311 evacuate the bubbles 50 upward from the bottom. In FIG. 8B, the opening 2311 evacuate the bubbles 50 rightward from the bottom.

Figure 9A:
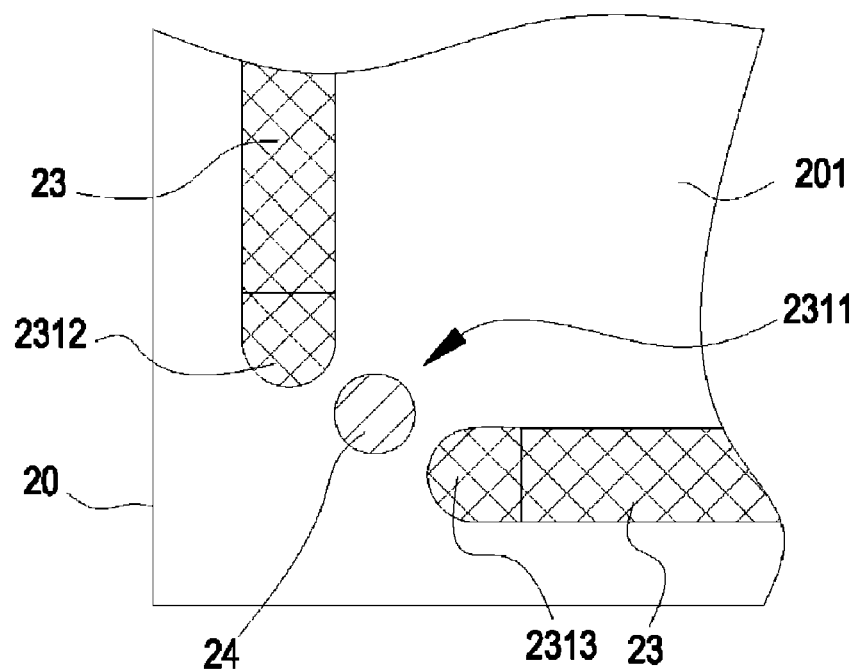
FIG. 9A is a schematic top view showing a point adhesive disposed in an opening in the patterned sealant according to the present invention.
Figure 9B:
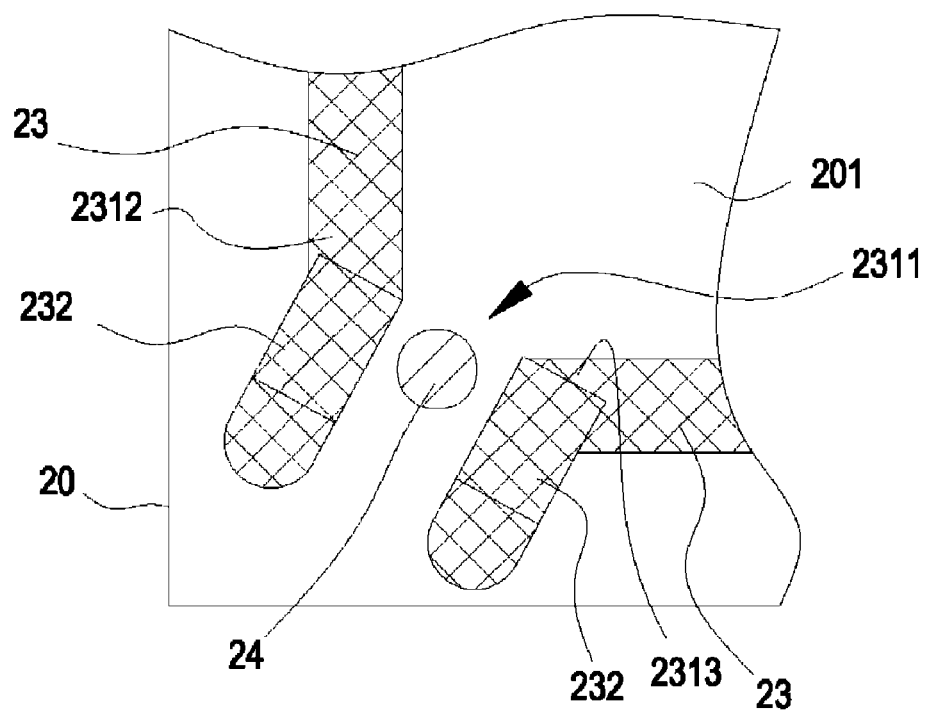
FIG. 9B is a schematic top view showing a point adhesive disposed in an opening in the patterned sealant with at least a guiding rib according to the present invention.

In the aforesaid patterned sealant 23, a point adhesive 24 (as shown in FIG. 9A and FIG. 9B) is formed in the opening 2311 (with or without the guiding rib 232). In FIG. 9A, the opening 2311 is divided into two channels by the point adhesive 24, while in FIG. 9B, the opening 2311 is divided into two channels with two parallel guiding ribs 232 by the point adhesive 24. In the present invention, the opening 2311 in FIG. 7B is the best mode.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A patterned sealant used in an attachment process for flexible substrates, capable of enclosing a liquid-phase material between a first substrate and a second substrate being pressed, the patterned sealant comprising:

a sealant material, being fixedly disposed on the first substrate;

wherein the sealant material forms a frame to contain a liquid-phase material and at least an opening formed by a first end sealant and a second end sealant is disposed in the sealant material;

wherein a circular point adhesive is provided within the frame at the opening;

wherein at least a guiding rib is extended from the first end sealant and/or the second end sealant;

wherein an included angle is formed between the guiding rib and the first end sealant or the second end sealant;

wherein the angle formed between the guiding rib and the associated end sealant from which the guiding rib extends is larger than 90 degrees but smaller than 180 degrees so that the width of the opening formed by the guiding rib and the first end sealant and/or the second end sealant increases as distance from the frame increases.

2. The patterned sealant as recited in claim 1, wherein the opening formed by the guiding rib and the first end sealant and/or the second end sealant the opening is disposed on a corner of the sealant material frame allowing for the evacuation of bubbles.

* * * * *